May 11, 1937.   W. A. WHATMOUGH   2,080,293
MEANS FOR AUTOMATICALLY MODIFYING THE
FLOW OF PULSATING FLUID FLOW STREAMS
Filed Oct. 15, 1934    3 Sheets-Sheet 1
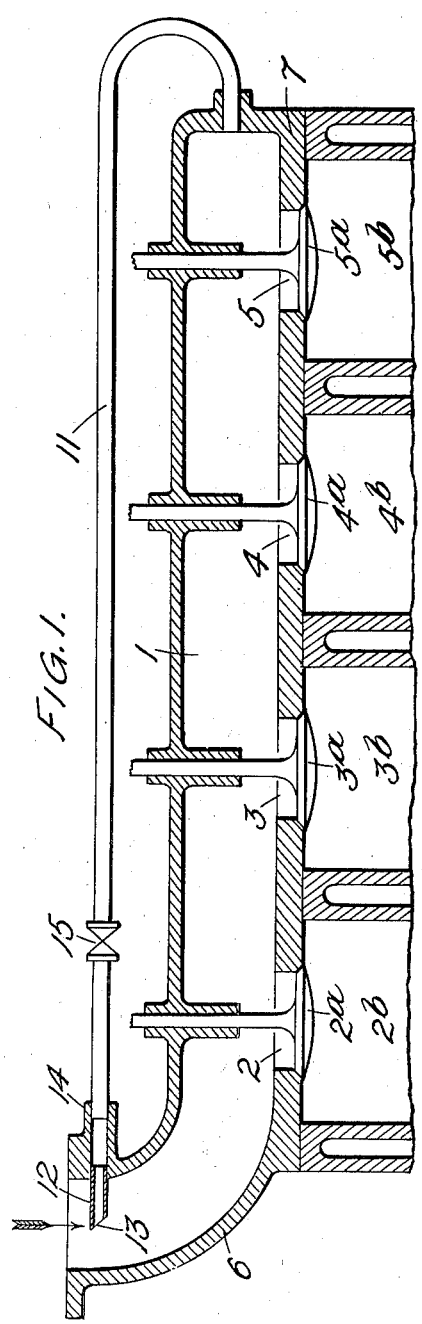
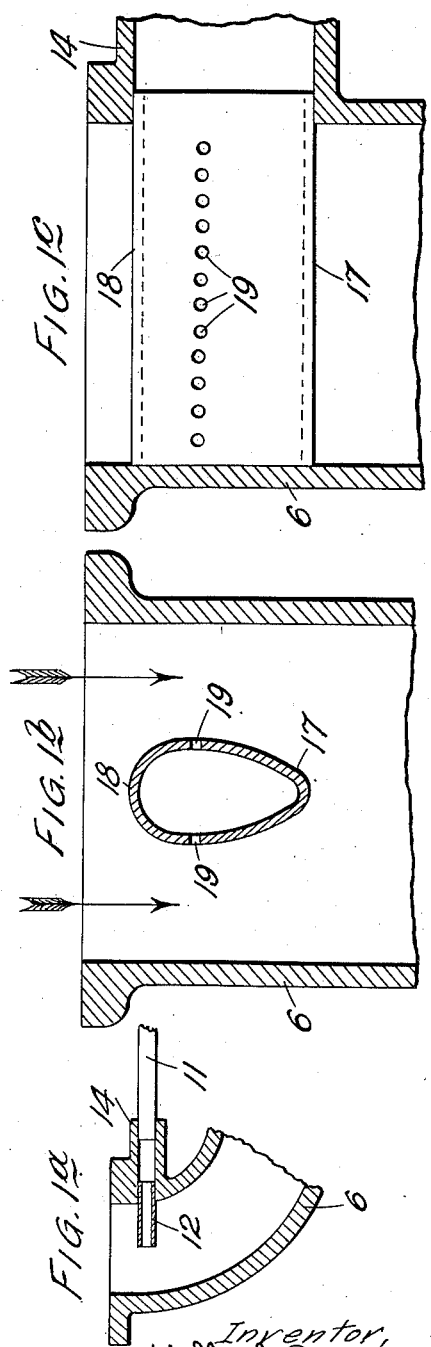

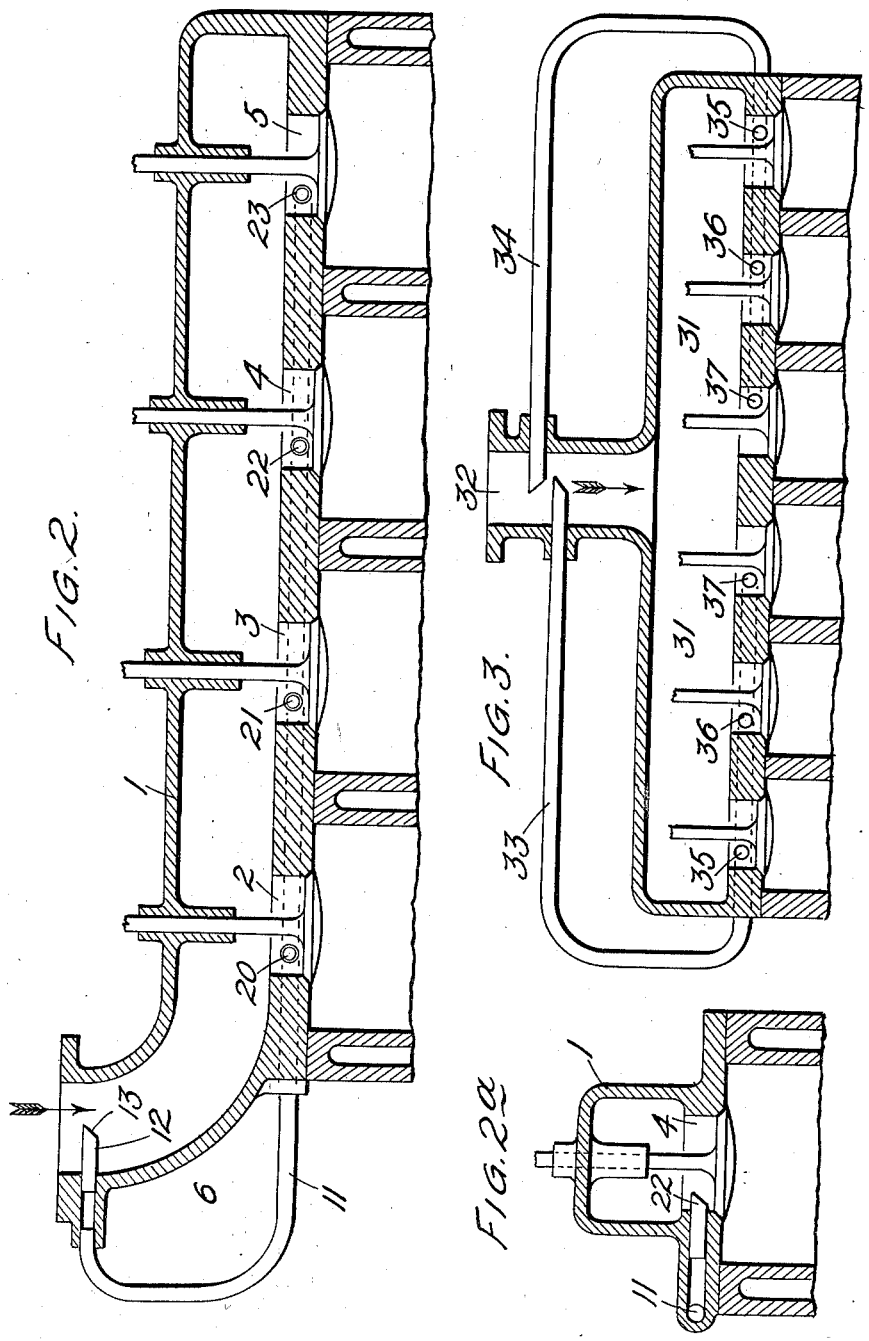

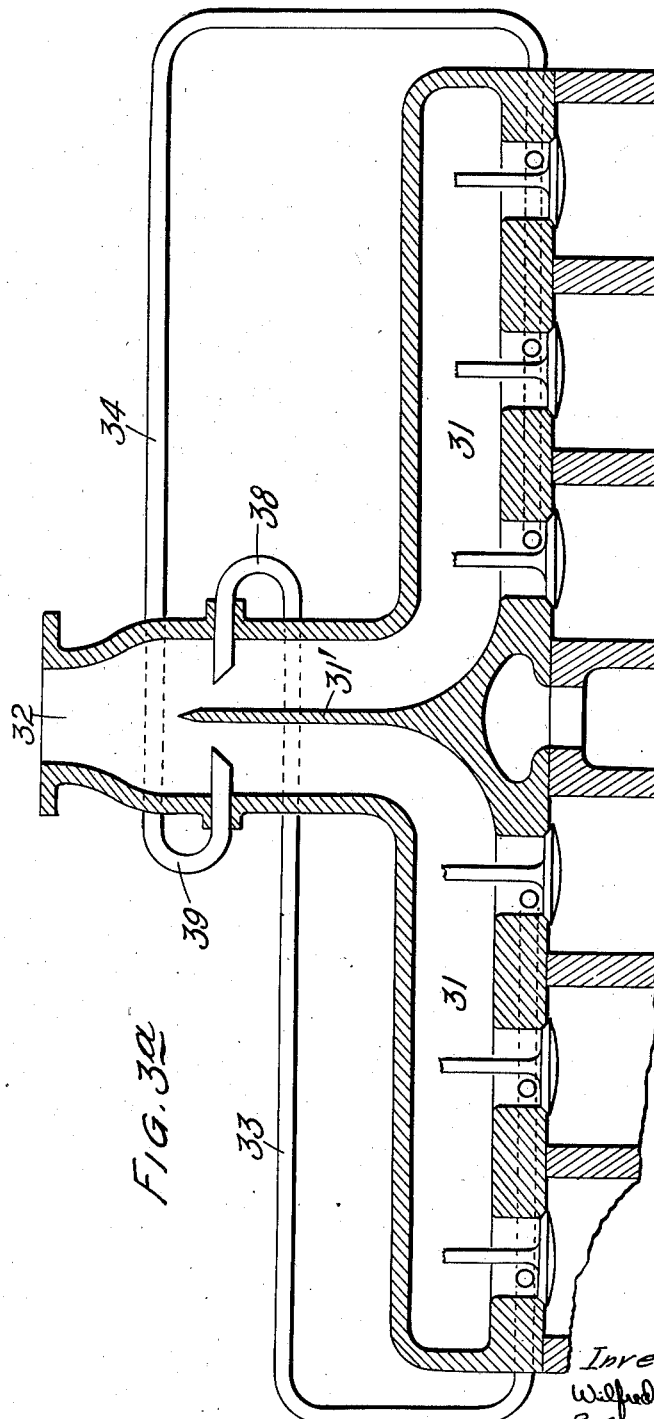

Patented May 11, 1937

2,080,293

UNITED STATES PATENT OFFICE 2,080,293

MEANS FOR AUTOMATICALLY MODIFYING THE FLOW OF PULSATING FLUID FLOW STREAMS

Wilfred Ambrose Whatmough, Golders Green, London, England

Application October 15, 1934, Serial No. 748,413
In Great Britain October 24, 1933

10 Claims. (Cl. 123—52)

The present invention concerns improvements in or relating to means for automatically modifying the flow of a pulsating stream of gaseous mixture in the induction system of an internal combustion engine.

The mixture supplied to an internal combustion engine during operation has of course a general flow from the carburettor towards the cylinders; it is recognized that this flow is a pulsating flow and that certain disadvantages result from the pulsations.

The main object of the present invention is to modify such pulsating flow so as to improve the operation of such an engine. This object is attained according to the invention by utilizing the dynamic (i. e. the velocity) effects of the fluid flow in a particular manner. It is to be observed that there are both static and dynamic effects in any conduit in which there is a flow of fluid. The static effects are due to the difference in pressure between two locations along the line of flow; the dynamic effects are due to the velocity of the flow and at any location this dynamic effect varies at different parts of the cross sectional area, being (in a round pipe) least at the periphery and greatest at the centre; according to the invention this variation in dynamic effect is utilized in producing a desired modification in the pulsation.

The various objects and the several features of the invention will become more fully apparent to those skilled in the art from the following description, in conjunction with the accompanying diagrammatic drawings.

In the drawings,

Fig. 1 indicates an induction system provided with simple control means;

Fig. 1ª shows a second form of control-tube end;

Figs. 1ᵇ and 1ᶜ show in end and side elevation respectively a third form of tube-end to an enlarged scale;

Figs. 2 and 2ª indicate an induction system provided with branched control means with an end adjacent to each valve;

Figs. 3 and 3ª indicate an induction pipe for a six cylinder engine with two control tubes.

The induction system of Fig. 1 is for a four cylinder internal combustion engine and comprises a main induction pipe 1 which supplies four sub-pipes 2, 3, 4 and 5 which respectively lead to the four valves 2ª, 3ª, 4ª and 5ª of four cylinders 2ᵇ, 3ᵇ, 4ᵇ and 5ᵇ.

The part 6 of the induction pipe nearer the supply (a downdraught carburettor) will be referred to as the near end or intake and the part 7 remote from the carburettor will be referred to as the far end. The near end 6 is connected to the far end 7 by means of a control tube or duct 11 (hereinafter referred to as a tube) which provides a throughway for fluid between the said ends. In this construction the far end of the control tube 11 is co-axial with the far end of the pipe 1 and forms a reduced continuation thereto. The control tube is provided at the intake 6 of the induction pipe with a projecting tube-end 12 the free end of which is bevelled to a chisel shape 13. This end 12 is in the construction shown adjustable by being rotatable in a socket 14 and also by being movable axially in the said socket so that its orificed face can be positioned as desired between the periphery and the centre of the intake 6. The dynamic effects of the pulsating flow of fluid in the induction pipe 1 upon the tube 11 can be varied in close approximation to the pulsating flow by these adjustments. In addition the tube 11 is provided with an adjustable valve 15 for controlling the extent to which the dynamic effects of the flow of fluid in the pipe 1 are transmitted through the tube 11.

With the end 12 positioned as in Fig. 1 there is, by reason of suction on the nozzle, a return flow induced in the tube 11 from the far end to the near end; the pulsations in this return flow synchronize with those in the intake 6, and both vary with the valve operation and the pumping action of the engine cylinders, so that the resultant return flow in the tube 11 follows at every portion of the engine cycle the pulsations in the main flow including those due to sudden valve closure. Variation in control is effected in accordance with the total pulsation effects, including those due to blow-back, produced in the induction system during the engine cycle.

The general effect of the return flow in the control tube is to reduce pulsations in and so facilitate uni-directional flow in the main intake and thus to tend to obviate resonance and reversals which are detrimental to volumetric efficiency of the engine.

In the construction of Fig. 1 the projecting end 12 is placed in the main intake of the induction system so that the dynamic effects acting on the control tube shall vary with and be proportionate to fluctuations in total flow through the said main intake.

The tube-end projecting into the fluid stream might in certain cases be non-adjustable. Also, it might be a plain tube with a circular orifice at right angles to its axis as indicated in Fig. 1a, but in that case adjustment would be by axial movement since rotation would not give any variation in effect. Further, it might be in the form of a streamlined (pear-shaped) throat 17, as shown in Figs. 1b and 1c, adapted to extend right across the intake 6 and having its blunt margin 18 towards the carburettor and being provided with a number of orifices 19.

In the case of a control which is adjustable it is preferable that its maximum capacity should be somewhat greater than the maximum required and that a reduction should be effected by a slight adjustment of the projecting tube-end 12.

The induction system of Fig. 2 is similar to that of Fig. 1 but the control tube 11, instead of having one near end and one far end, is branched so that it is provided with one branch to each of the four sub-pipes 2, 3, 4 and 5; each of these branches is provided with a projecting end (20, 21, 22, 23 respectively) which may be similar to the end 12 and adjustable for position in like manner. It is to be noted that with such a branched control tube each branch end is affected by the pulsations specific to the sub-induction-pipe 2, 3, 4 or 5 in which it is situated.

Owing to the coupling of the primary and the return flows the corrections are automatic. Any adjustment is effective over the working range since the amounts of main direct and the main induced flows remain proportionate throughout the pulsating periods. It is to be observed that an operating cylinder supplies energy to provide flow in the desired direction so as to give a lead towards a non-working cylinder.

The action is as follows:—

The projecting end 12 is adjusted in accordance with the overall effect desired. Each branch-end has its sloping orifice facing its valve and may be adjusted independently. Assume that a valve in one sub-induction-pipe is closed. Suction on the end 12 will induce a flow through the control tube from the individual branches and consequently there will be a flow from the main induction pipe into the sub-induction-pipe with the closed valve thus obviating a dead end and providing a flow towards the valve as it opens. When the valve opens, the suction action of the associated cylinder increases the flow in the sub-induction-pipe and, as this flow now passes the branch end on its way to the cylinder, there is a suction effect on the branch end which opposes the suction effect of the end 12 and so reduces the flow in that branch of the control tube; at the same time the relative absence of suction effect on the branch ends associated with valves that are closed results in the suction on end 12 predominating in those branches and increasing the return flow through those branches.

When the valve in the first sub-induction-pipe again closes there results a backward pulse in that sub-pipe and at the same time the suction of the end 12 becomes effective again in that branch of the control tube. The branch end if suitably adjusted will, within the limits of its capacity, absorb the reversals of flow due to valve closure pulses and will tend to obviate the effects of blowback. The return flow delivered from the control pipe at the end 12 is there converted into a forward flow in the main stream.

In Fig. 3 there is indicated a six-cylinder engine with a T-type induction pipe 31 having a central intake 32 fed by a single carburetor, three cylinders being fed by each half of the pipe 31. Two branched control tubes 33 and 34 are provided, one associated with each half of the induction pipe 31; each control pipe has a projecting branch end as 35, 36, 37 in each of three associated sub-induction-pipes, and its near end is in the intake 32. In such an engine without control pipes, suction in No. 1 cylinder is interfered with by the opening of No. 5 valve and the divided demand results in volumetric deficiency in both cylinders. With the control pipes as in Fig. 3, suction arising from No. 1 cylinder (which is actively pumping as No. 5 begins) gives an excellent lead towards No. 5 valve port owing to suction in the intake 32 being effective in that part of the induction pipe containing No. 5 valve.

In Fig. 3a there is indicated a system similar to that of Fig. 3 except that the main intake is divided by a division plate 31' and the control tubes 33 and 34 are provided with crossover ends 38 and 39 respectively which open into that part of the divided induction pipe with which their branched ends are not associated.

Combinations of control units may be employed, e. g., a unit for influencing induction pipe flow in general, and another (branched) unit for regulating specific effects in branches thereof. Any complex induction system may be dealt with in convenient sub-divisions. Alternatively, one control unit may serve for two gallery pipes as for example in a combustion head with dual inlet valves.

Control units are adapted for adjusting differences in effective flow of valve ports (due to dimensional or directional differences) by adjusting branch ends to equalize compression pressures, which is equivalent to equalizing flow values.

What I claim is:—

1. The combination with the induction system of an internal combustion engine comprising an induction pipe through which flows a pulsating stream of gaseous mixture of a control-tube which opens into the said pipe at an earlier and a later location and, at one location at least, projects with an apertured end into the gaseous stream in the pipe, the arrangement being such that the dynamic influences of the gaseous stream cause a reverse flow of part of the said stream through the said control-tube from the later to the earlier location, which reverse flow modifies the pulsations in the main stream.

2. In the induction system of an internal combustion engine, the combination with an induction pipe through which flows a pulsating stream of gaseous mixture of a control-tube which opens at its ends into the said pipe at two separated locations, one of said locations being earlier than the other regarded relatively to the stream flowing in the pipe and the tube, at the earlier location projecting with an apertured end into the said stream with the aperture therein so positioned that the dynamic influences of the said stream cause a reverse flow of part of the stream through the control-tube from the later to the earlier location.

3. The combination with the induction system of an internal combustion engine comprising an induction pipe through which flows a pulsating stream of gaseous mixture of a control tube which opens into the said pipe at an earlier and a later location and, at one location at least, projects with an apertured end into the stream flowing in the pipe, means being provided for adjusting the aperture in relation to the said stream and the arrangement being such that the dynamic influences of the gaseous stream cause a reverse flow of part of the said stream through the control-tube from the later to the earlier location, which reverse flow modifies the pulsations in the main stream.

4. In the induction system of an internal combustion engine, the combination with an induction pipe through which flows a pulsating stream of gaseous mixture of a control-tube which opens at its ends into the said pipe at two separated locations, one of said locations being earlier than the other regarded relatively to the stream flowing in the pipe and the tube at the earlier location projecting with an apertured end into the said stream with the aperture therein so positioned that the dynamic influences of the said stream cause a reverse flow of part of the stream through the control-tube from the later to the earlier location, the said projecting end of the tube being bevelled to a chisel-like shape.

5. In the induction system of an internal combustion engine the combination of an induction pipe through which flows a pulsating stream of gaseous mixture and a control-tube through which part of the said stream is caused to flow by the dynamic influences of the main stream, the said tube opening at one end into the pipe at one location by way of an adjustable tube-end projecting into the stream flowing in the pipe and opening at the other end into the pipe at a later location than the first-mentioned location, the said part of the stream flowing through the tube in the reverse direction to that in which the main stream flows through the pipe.

6. An induction system for an internal combustion engine including an induction pipe through which flows a pulsating stream of gaseous mixture, apertures in the wall of the pipe at two separated locations, one of said locations being earlier than the other regarded relatively to the stream flowing in the pipe, a tube-end engaged in the aperture at the said earlier location to project transversely of the pipe into the stream flowing therein, and a control-tube connecting the said apertures so that the dynamic influences of the said stream cause a reverse flow of part of the gaseous mixture through the said tube from the later to the earlier location.

7. In an induction system as claimed in claim 6, the use of a tube-end having an aperture disposed obliquely of the pipe.

8. In an induction system as claimed in claim 6, engaging the tube-end in the aperture in the wall of the pipe in such a manner that the extent to which it projects into the stream flowing in the pipe may be adjusted.

9. In an induction system for an internal combustion engine, the combination with a branched induction pipe through which flows a pulsating stream of gaseous mixture of a single branched control-tube projecting by its one apertured end into the pipe in front of the branches of the latter and having the apertured ends of its branches projecting into the branches of the said pipe.

10. In an induction system for an internal combustion engine, the combination with a sectionalized induction pipe for a pulsating stream of gaseous mixture of a plurality of control-tubes each of which has one apertured end projecting into one section of the pipe and its other end opening into another section of the pipe, the location at which the apertured end of a tube projects into a section of the pipe being earlier than the location at which another tube opens into the said section of the pipe regarded relatively to the stream flowing in the said section.

WILFRED AMBROSE WHATMOUGH.